（12）United States Patent
Busto

(10) Patent No.: US 11,879,525 B2
(45) Date of Patent: Jan. 23, 2024

(54) WAVE MACHINE

(71) Applicant: The Rocky Mountain Surf Company, LLC, Hayden, ID (US)

(72) Inventor: Rodney J Busto, Hayden, ID (US)

( * ) Notice: Subject to any disclaimer, the term of this patent is extended or adjusted under 35 U.S.C. 154(b) by 384 days.

(21) Appl. No.: 17/287,357

(22) PCT Filed: Oct. 22, 2019

(86) PCT No.: PCT/US2019/057490
§ 371 (c)(1),
(2) Date: Apr. 21, 2021

(87) PCT Pub. No.: WO2020/086620
PCT Pub. Date: Apr. 30, 2020

(65) Prior Publication Data
US 2022/0170282 A1 Jun. 2, 2022

Related U.S. Application Data

(60) Provisional application No. 62/748,725, filed on Oct. 22, 2018.

(51) Int. Cl.
*E04H 4/00* (2006.01)
*F16H 25/22* (2006.01)
*F16H 25/20* (2006.01)

(52) U.S. Cl.
CPC ....... *F16H 25/2247* (2013.01); *E04H 4/0006* (2013.01); *F16H 2025/2031* (2013.01); *F16H 2025/2081* (2013.01)

(58) Field of Classification Search
CPC ... A63B 69/125; E04H 4/0006; E04H 4/0012; E04H 4/12
See application file for complete search history.

(56) References Cited

U.S. PATENT DOCUMENTS 1,076,779 A * 10/1913 Miller .................... A63G 3/00
472/13
4,881,280 A * 11/1989 Lesikar .................... B05B 1/36
4/678

(Continued)

FOREIGN PATENT DOCUMENTS

RU 2403938 * 11/2010 ......... A63B 69/0093

*Primary Examiner* — David P Angwin
*Assistant Examiner* — Nicholas A Ros

(57) ABSTRACT

A wave machine (8) that produces different shapes of standing, parabolic-shaped waveforms (150) used by surfers (200). The parabolic waveforms (150) have different face angles and depths. The machine (8) includes a rotating container (10) partially filled with a fluid 140. When the container (10) is rotated, a standing, parabolic waveform 150 is created in the fluid (140). In one embodiment, the container (10) is bowl container (11) with curved panels (60) and terminate at an upper edge (16). On or near the upper edge (16) of the sidewall (14) is upper flange (18) that partially extends into the bowl container (11). The bowl container (11) is coupled to a speed adjustable drive mechanism (50). As the bowl container (11) is rotated, fluid (14) is forced outward against the sidewall (14) and forms a parabolic waveform (150). As the speed of rotation is increased, the fluid (140) flows upward over the sidewall (14) and against the upper flange (18). The thickness, depth and face of parabolic waveform (150) adjacent to the sidewall (14) are increased.

8 Claims, 21 Drawing Sheets

(56) References Cited

U.S. PATENT DOCUMENTS

| | | | | |
|---|---|---|---|---|
| 5,115,974 A | * | 5/1992 | Tobias | B05B 17/085 239/289 |
| 5,205,670 A | * | 4/1993 | Hill | E04H 4/0006 472/13 |
| 6,336,771 B1 | * | 1/2002 | Hill | A63G 31/007 4/491 |
| 7,950,875 B2 | * | 5/2011 | Benham | A63B 69/0093 4/491 |
| 9,457,290 B2 | * | 10/2016 | Hill | A63H 33/42 |

* cited by examiner

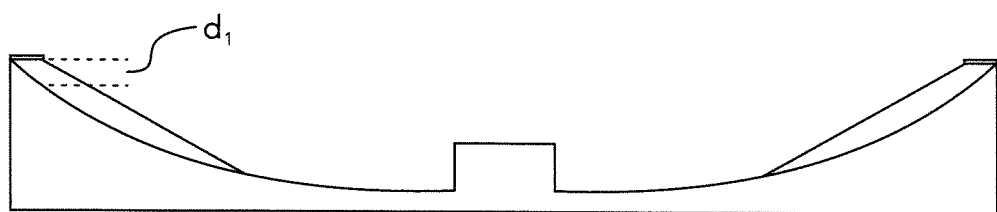
FIG. 14
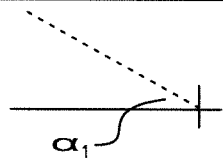
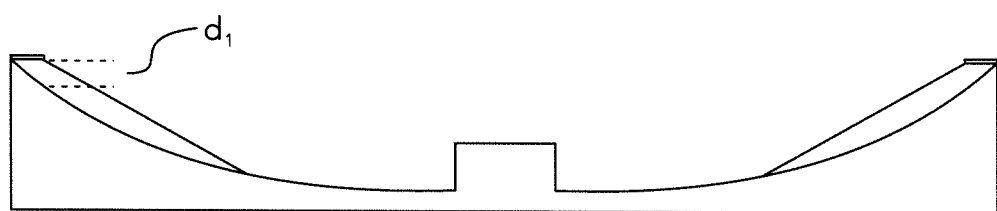
FIG. 15
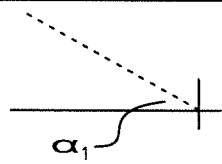
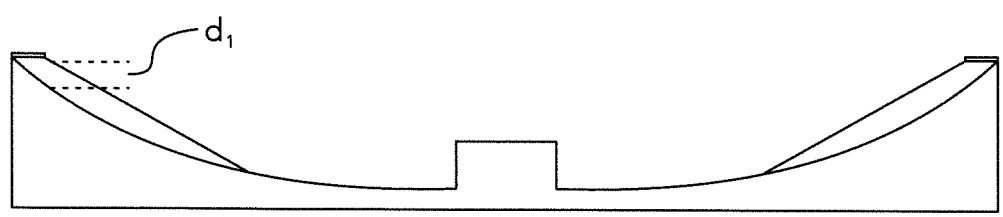
FIG. 16
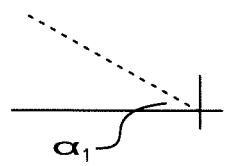

WAVE MACHINE

This utility patent application is based on and claims the filing date benefit of U.S. provisional patent application (Application No. 62/748,725) filed on Oct. 22, 2018.

TECHNICAL FIELD

The present invention relates to machines that generate standing waveforms for water surfing or wake surfing, and more particularly to machines that produce different standing waveforms that have different face angles and depths.

BACKGROUND ART

It is well known that ocean wave surfing and wake surfing behind a boat are very challenging activities that require hundreds of practice hours. With ocean surfing and wake surfing, the waves or wakes provide energy that propels the surfers over the water. To succeed, surfers must learn to identify areas of the wave that will provide an optimal ride, learn how to 'catch' the wave, and maintain balance. When the rider learns how to stand up, catch the wave, and maintain balance, the rider must then learn how to manipulate the board over different areas of the wave to maintain the ride.

Wake surfing is a variation of wake boarding. A wake boarder will sometimes ride the crest and face of the waves formed behind a boat like wave surfers, they are not propelled by the waves. Instead, the wake boarder is pulled by a rope that enables them to slalom back and forth over the wake of the boat. Like ocean wave surfers, however, wake surfers must always learn how to manipulate the board over the face of the waves or wakes and maintain his or her balance to be propelled by the wake. The wake surfer is assisted by the tow rope until he or she is able to drop the rope and be propelled by the wake similar to an ocean wave or an ocean wave surfer.

What is needed is an apparatus used to make different standing waveforms that can be adjusted for different levels of wave surfers or wakes surfers to advance skills.

DISCLOSURE OF THE INVENTION

A wave machine that includes a container partially filled with a fluid. When the container is rotated, the fluid forms a parabolic-shaped standing waveform (hereinafter called a 'parabolic waveform') inside the container that can be used for surfing.

In one embodiment, the container includes a curved or upward diagonal bottom surface and an upward extending sidewall. In one embodiment, the container is a bowl with a curved sidewall and an upper edge. The container is coupled to a speed adjustable drive mechanism that rotates the container in one direction. The speed of rotation may be adjusted to create different parabolic waveforms. Mounted on or near the upper edge of the sidewall is an upper flange that extends inward from the sidewall.

During operation, the container is partially filled with a fluid. The drive mechanism is activated that rotates the container at a fixed speed. As the container is rotated, centrifugal forces are exerted on the fluid causing the fluid to flow outward and accumulate along the sidewall and forms a parabolic waveform that can be used by a surfer. By adjusting the speed of rotation of the container, fluid accumulates along the sidewall and travels up the sidewall, the face angle and depth of parabolic wave front may be increased or decreased.

In one embodiment, the container is mounted on a rigid frame setup up a flat support surface. A motor and track assembly are used to rotate the rigid frame and container over the support surface. In another embodiment, the container is made of buoyant material and configured to float in a body of water. A water propulsion system is used to rotate the buoyant container in the body of water.

In one embodiment, the container is a bowl shaped and partially filled with water. When rotated, parabolic waveforms are formed in the water. Located in the bowl container is an optional island. In this embodiment, an optional a water/pump filter tank, an egress and ingress water conduits, and a wave tunnel generator may be used.

In another embodiment, a similar bowl container is used but uses a fluidized bed made of granules exposed to pressurized air. The fluidized bed flows as a fluid and has similar physical properties of a fluid such that is acted upon by gravitational and centrifugal forces such that it simulates water but dry. In this embodiment, a plurality of air conduits is on the inside surface of the sidewall of the container. The granules are made of sand, plastic beads, or other granular material. The air conduits are radially aligned in the container and include a plurality of branches. A plurality of air holes is formed on the air conduits and branches. The end of the air conduits are attached to a swivel conduit that attaches to an external pressurized air source.

In another embodiment, the bowl container is configured to float in a large body of water.

In still another embodiment, the bowl container fits into a second bowl to form a bowl in a bowl embodiment.

BRIEF DESCRIPTION OF THE DRAWINGS

FIGS. 11-16 are illustrations showing how the water inside the container is forced outward and creates different parabolic waveforms with different face angles and depths as the speed of the container is increased.

BEST MODE FOR CARRYING OUT THE INVENTION

Figure 1:
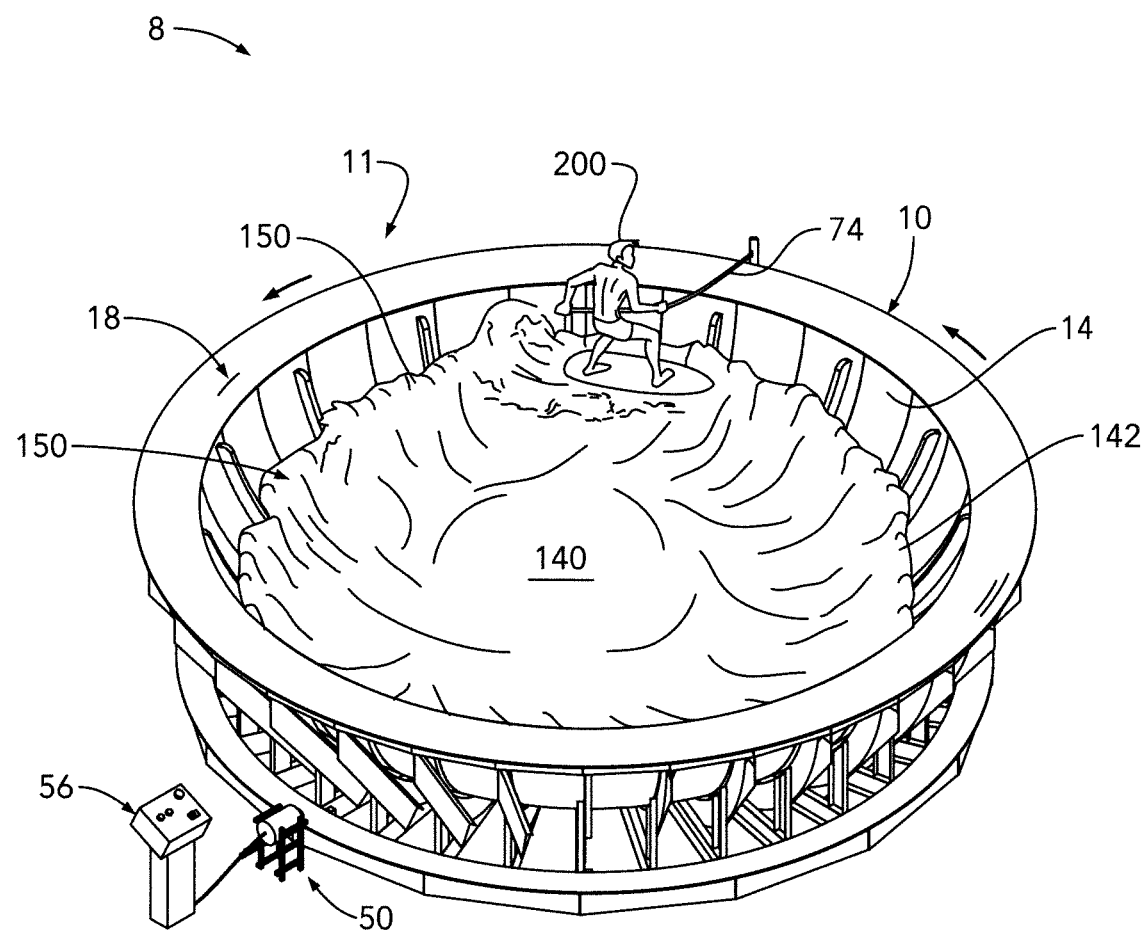
FIG. 1 shows top, front perspective view of a bowl-shaped container partially filled with water being rotated and forming a standing, parabolic waveform inside the container that extends partly up the sidewall of the container and used by a surfer.

A standing wave machine 8 comprising a container 10 configured to be partially filled with a fixed volume of fluid 140. The container 10 includes sidewall 14 and a top upper edge 16. Mounted on or near the upper edge 16 is an upper flange 18 that extends inward from the upper edge 16. The upper flange 18 is configured to block or prevent fluid 140 from flowing upward along the sidewall 14 and extending pass the upper edge 16. Coupled to the container 10 is a means for rotating the container 10 around its center vertical axis 13. The means for rotating is configured to rotate the container 10 at different speeds to create centrifugal forces on the fluid 140 that causes the outer edge of the fluid 140 to flow outward and upward against the sidewall 14 and form a parabolic waveform 150 used for surfing.

In the embodiments shown, the container 10 is a bowl-shaped structure, herein after called a bowl container 11, with closed bottom surface 12 and upward extending curved sidewall 14. The bowl container 11 is configured to rotate around its vertical axis 13 with a means for rotating the bowl container 11. The bowl container 11 is is configured to hold a fixed volume of a fluid 140. In one embodiment, the fluid 140 is water, indicated by the reference number 142 causing it to spread outward. When rotated, a centripetal force is imparted to the water 142. Friction between the sidewall 14 of the bowl container 11 and the water 142 causes the water 142 to rotate synchronously to the bowl container 11. As the bowl container 11 rotates, inertial forces constrained by centripetal force acting on the water 142 cause it to spread outward from the center and gather along the outside diameter and lift up above and dip below the normal or resting water level as the water 142 spreads out along the transitional, vertical, and past vertical surfaces of the sidewall 14. The effect of the centripetal force acting on the water 142 in the bowl container 11 is to form a wall of water gathered along the sidewall 14 moving in the direction of spin and conforming to the shape of the outside diameter of the sidewall 14. The parabolic waveform 150 is formed in the area of the bowl container 11 where surfing can be performed. When rotation of the bowl container 11 is discontinued, the water 142 returns to normal or resting levels as rotational energy is stopped and the bowl container 11 and the water 142 becomes stationary.

Different container forms, such as spherical, cylindrical, or toroidal, allow the vertical axis of rotation to be inclined to any orientation over to a horizontal axis of rotation provided the water velocity is fast enough to produce the needed centripetal force to keep the water 142 against the sidewall 14 of the bowl container 11. The ability of centripetal force to resist gravity allows the bowl container 11 to function in other than vertical axis of rotation. However, the high velocity water flow required for any axis of rotation other than vertical negates the purpose of this invention to simulate water velocities and operational water depths to that of open water traditional surfing which duplicates the traditional surfing experience.

The effect of the described centripetal wave machine 8 is to produce a standing parabolic waveform 150 with a front face where water flows past a surfer 200 riding a surfboard who remains in a relatively stationary position relative to the shore but is limited to maneuvering about the wave's face. The surfer 200 is pulled down the slope by gravity which propels the surfer against the flow of the water or upstream to the flow of water. The surfer 200 maneuvers the surfboard by turning up and down the wave face to position the surfboard to continuously glide down the water slope balancing the pull of gravity upstream against the downstream pull of the flow of water as it moves past the surfer along the sidewall. The surfer 200 is swept away with the flow of water if he falls off the surfboard where safety nets or other retrieval devices can remove the surfer 200 and surfboard from the water flow. The surfer 200 may retreat to the non-rotating island 90. In the case of the centripetal wave machine, depending on container shape and configuration, the surfer 200 can also recover his surfboard as he is moving downstream with the flow and paddle with his hands and arms to catch the wave again as he directs the surfboard back down the slope of the wave face. Upon catching the wave again, the surfer 200 would again become relatively stationary as the water passes by him along the pool wall.

More specifically, FIG. 1 shows as wave machine 10 that uses a bowl container 11 partially filled with water 142. When the bowl container 11 is rotated, a standing, parabolic waveform 150 is formed inside the bowl container 11 that extends partly up the sidewall 14 and used by a surfer 200. The surfer 200 is shown holding onto an optional lanyard 74.

Also shown in FIG. 1 is an upper flange 18 located over the top edge of the container 11 and a drive motor 50 and a control module 56.

Figure 2:
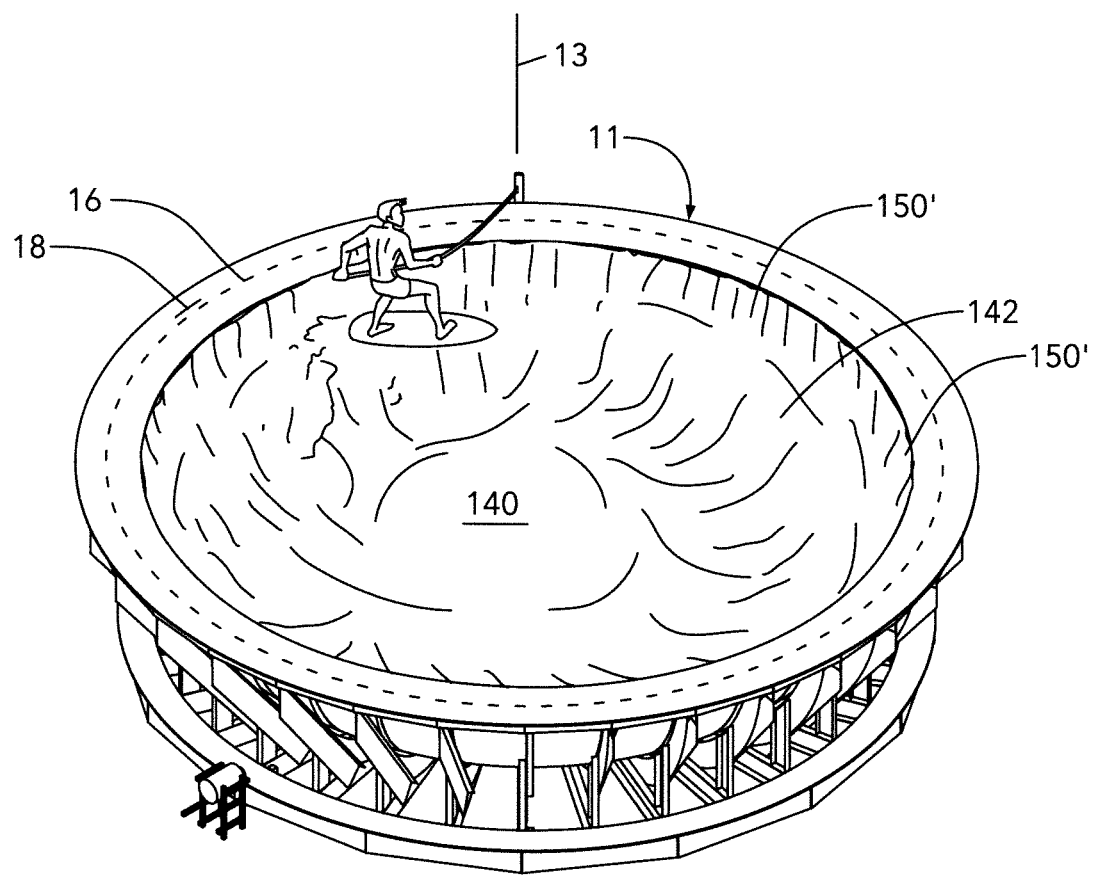
FIG. 2 is another top, front perspective view of a bowl-shaped container shown in FIG. 1 being rotated at a faster rate and forming a standing, parabolic waveform inside the container that extends up to a flange located along the upper edge of the sidewall.

FIG. 2 is a top front perspective view of the bowl-shaped container 11 in FIG. 1 that is rotated at a faster rate than the bowl container 11 in FIG. 1, which forms a higher standing, parabolic waveform 150'. The top edge of the parabolic waveform 150' abuts the inside surface of the upper flange 18. As discussed further, the higher standing, parabolic waveform 150' has a steeper front face and deeper relative to the bottom surface 12 and sidewall 14 of the bowl container 11.

Figure 3:
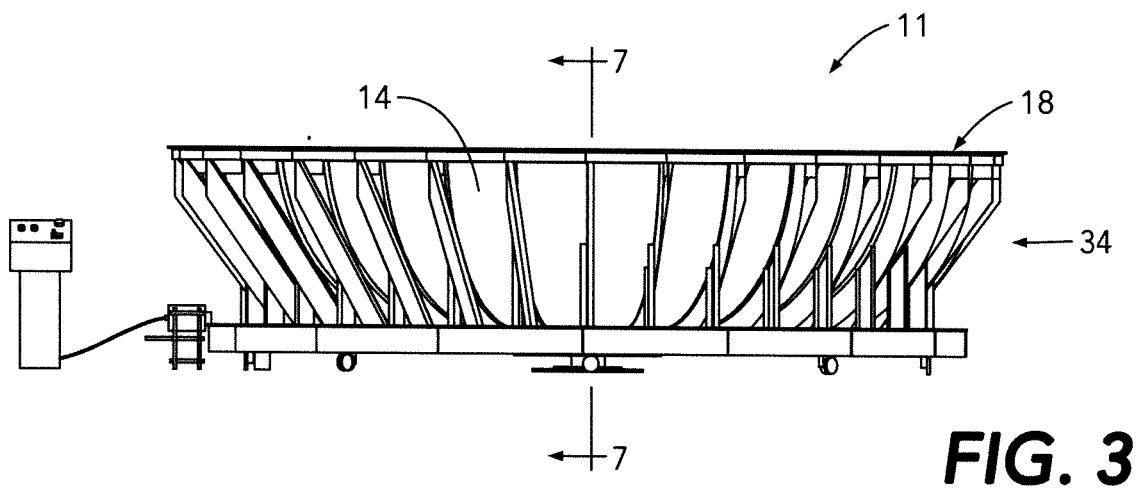
FIG. 3 is a side elevational view of the container shown in FIGS. 1 and 2.
Figure 4:
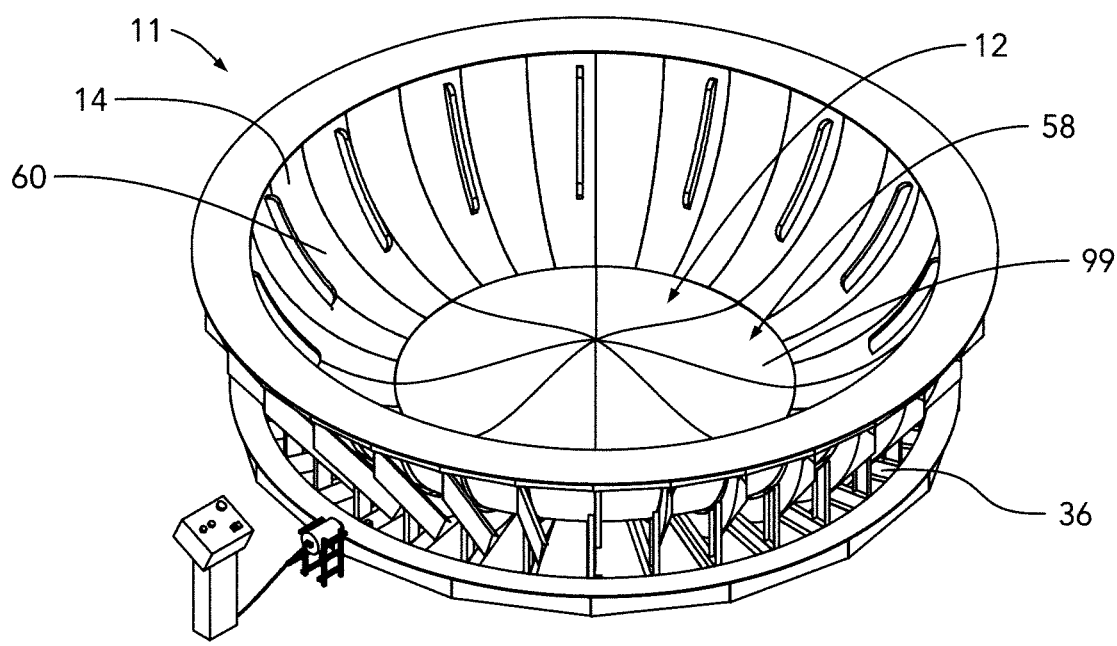
FIG. 4 is a top, front perspective view of the container shown in FIGS. 1, 2 and 3 without water.
Figure 5:
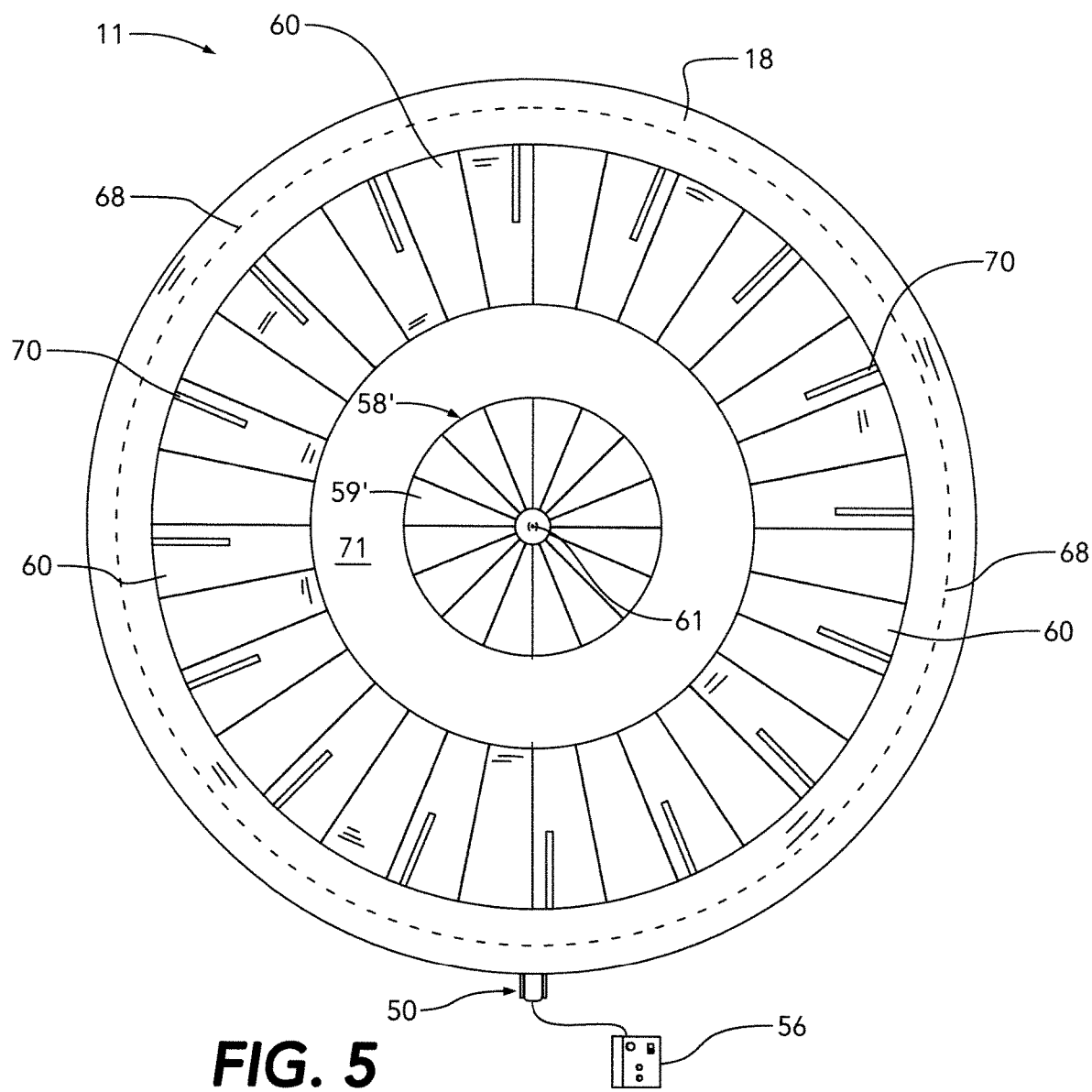
FIG. 5 is a top plan view of the container shown in FIG. 4 shown in FIGS. 1, 2 and 4.
Figure 6:
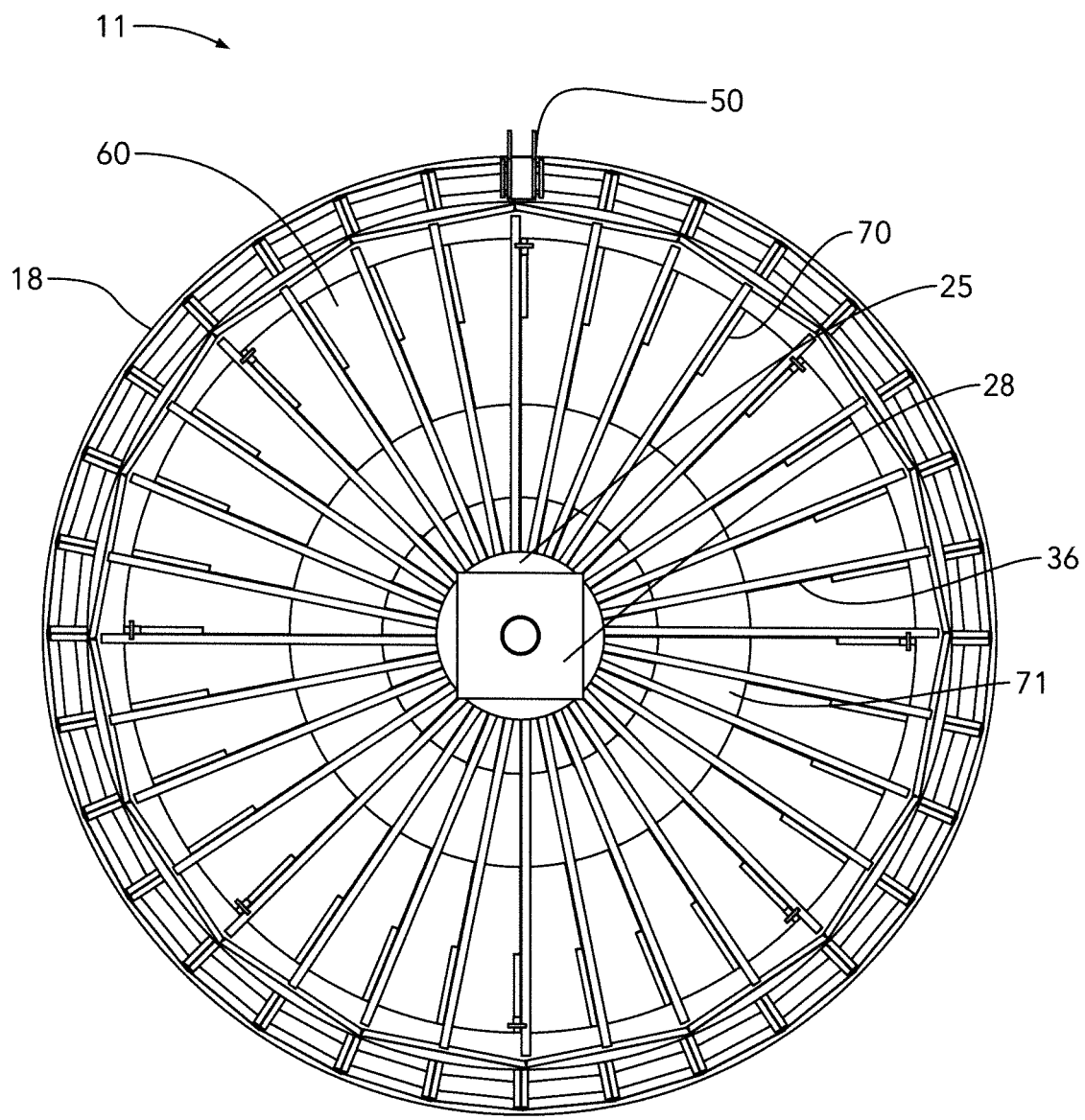
FIG. 6 is a bottom plan view of the container shown in FIG. 5.
Figure 7:
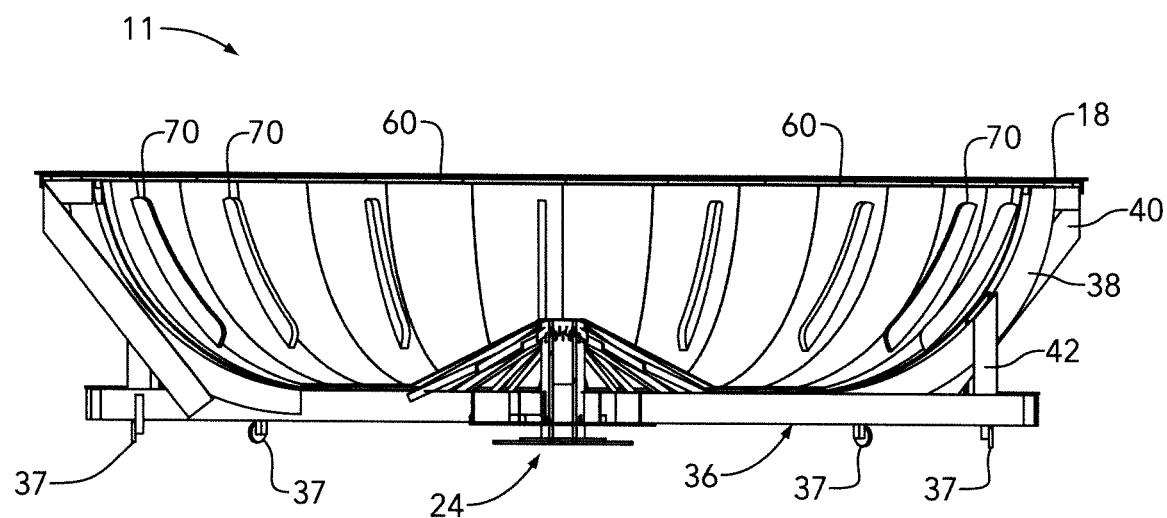
FIG. 7 is a sectional, side elevational view of the container taken along line 7-7 in FIG. 3.
Figure 10:
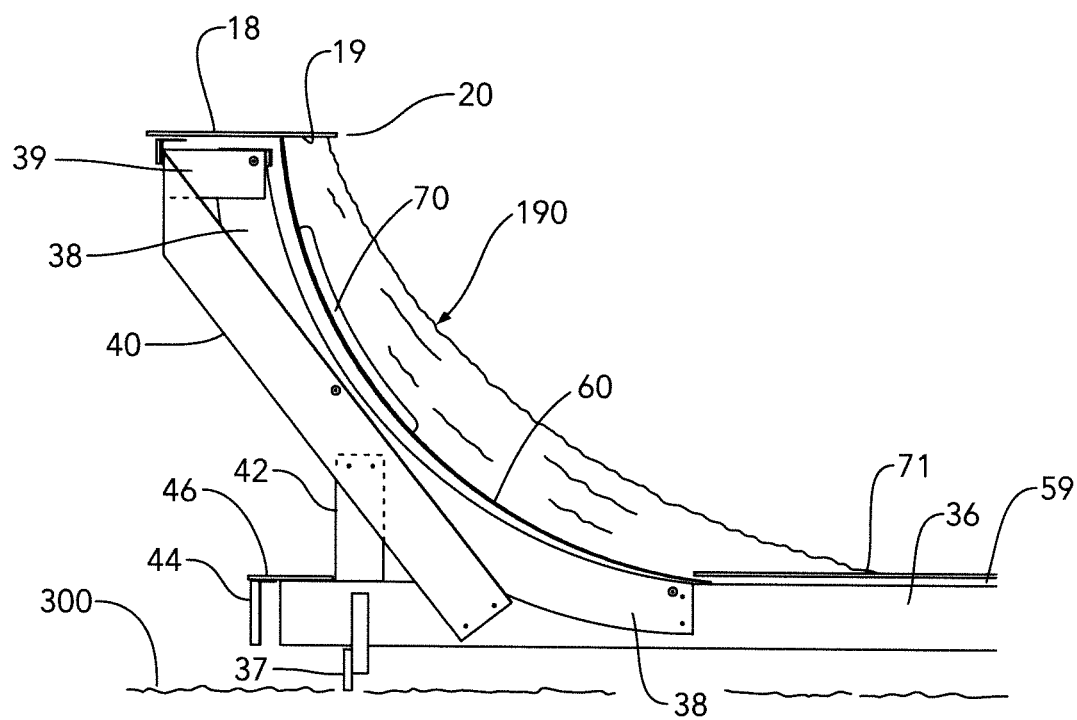
FIG. 10 is a partial, sectional view of the container partially filled with water and showing a volume of water moving outward and upward along the sidewall and against the upper flange.

As shown in FIGS. 3-5, the bowl container 11 includes a rigid frame 34 that includes a plurality of radially aligned beams 36. The proximal ends of the beams 36 are attached to a center hub assembly 24. As shown more clearly in FIG. 10, each beam 36 is attached to a curved inside member 38, a diagonal member 40 and a vertical member 42. The proximal end of each beam 36 extends beyond the vertical member 42. Attached to the proximal ends of the beams 36 is a horizontal end beam 44. The section of the top surface of the section of beam 36 that extends beyond the vertical member 42 is a circular, horizontal drive flange 46. Attached to the lower edge of the beam 36 near the distal end is a support wheel 37.

FIG. 4 shows curved panels 60 attached to the inside surface of the curved members 38. The curved panels 60 are configured so that the bottom surface 12 and an upper section of the sidewall 14 of the bowl container 11 are oriented approximately 60 degrees apart.

Located inside the central area of the bowl container 11 is a raised center dome 58 that extends over the bowl container's center axis 13. The raised center dome 58 is made of eight, pie-shaped panels 59. FIG. 5 shows an alternative bowl container 11 that uses a coaxially aligned gap ring 71 that abuts the inside edges of the curved panels 60. The inside edge of the gap ring 71 abuts a smaller diameter center dome 58' made up of sixteen pie-shaped panels 59' and a center plate 61.

As shown in FIGS. 5, 6, 7, 10, attached to the inside surface of the curved panels 60 are elongated rubber paddles 70. The paddles 70 are evenly spaced apart over the inside surface of the sidewall 14 of the bowl container 11 and used to force the water 142 to rotate with the rotating bowl container 11. In the embodiment shown, the paddles 70 are curved and extend approximately 2 to 3 inches upward from the inside surface of the curved panels 60.

Located adjacent to the rigid frame 34 is a drive mechanism 50 that includes a drive motor 52, a drive wheel 53, and a drive motor frame 54. The axis of the drive motor 52 is configured to rotate over the drive flange 46 to rotate the bowl container 11. When the drive motor 52 is activated, the drive wheel 53 presses against the drive flange 46 causing the entire bowl container 11 to rotate. In the embodiment shown, the drive motor 52 is connected to a control module 56 operated by an operator that manually adjusts switches that control the rate of rotation of the bowl container 11.

Attached to the distal ends of the diagonal member 40 and the inside curved member 38 is a horizontal top bracket 39. Attached to the top edge of the top bracket 39 is the upper flange 18. The inside section 19 of the upper flange 18 extends inward and hangs over inside surface of the curved panels 60 approximately 8 to 12 inches.

As stated previously, the proximal ends of the beams 36 are attached to the hub assembly 24. The hub assembly 24, shown more clearly in FIG. 8, includes an upper plate 25, a center spindle 27, and a lower ground plate 28. During assembly, the lower ground plate 28 is affixed to a support surface 300 via connectors 29. A thrust bearing (not shown) is disposed between the upper plate 24 and the center spindle 25 that enable the upper plate 24 to rotate around the spindle 25. Mounted on the upper plate 25 are thirty-two brackets 26 that connect to the beams 36 attaching the proximal ends of the beams 36 to the upper plate 24. The spindle 25 extends upward and beyond the upper plate 25. Attached to the upper end of the spindle 25 are ribs 32 that extend diagonally downward and connect to a beam 35. The panels 59, 59' used on the center domes 58,58' respectively, are then attached to the ribs 32.

During assembly, adjacent curved panels 60 overlap and connected to a curved member 38. Suitable connectors may be used to attach the longitudinal edges of the curved panels 60 to the curved members 38. A suitable adhesive/sealant may be used between the curved panels 60 and between the abutting edges of the curved panels 60 and the gap ring 71 and the pie-shaped panels 58. 58'. After assembly, the bowl container 11 is a watertight vessel.

The bowl container 11 in FIGS. 1-5 measures 18.5 feet in diameter. The vertical height of the sidewall 14 formed by the curved panels 60 is approximately 5 feet. Formed on the inner section of the bowl container 11 is a large conical dome 58 or small conical dome 58'. The curved panels 60 curve upward and terminates at the upper flange 18. Each curved panel 60 is triangular or pie-shaped and includes a lower curved edge that either abuts the gap ring 71 or abuts the panels 59' used the small conical dome 58'.

As stated above, when the bowl container 11 is rotated, forces exerted in the water 142 creates parabolic waveforms 150 that surfer 200 rides. The face angle (a) of the parabolic waveform 150 and the depth (d) of the parabolic waveform 150 relative to the curved panel 60, varies depending on the rotation speed of the drive motor 52. The relation is shown more clearly in FIGS. 11-16 which are illustrations showing how the water 142 is forced outward in the bowl container 11 and form different parabolic waveforms 150 as the bowl container 11 is rotated at different rates.

Figure 11:
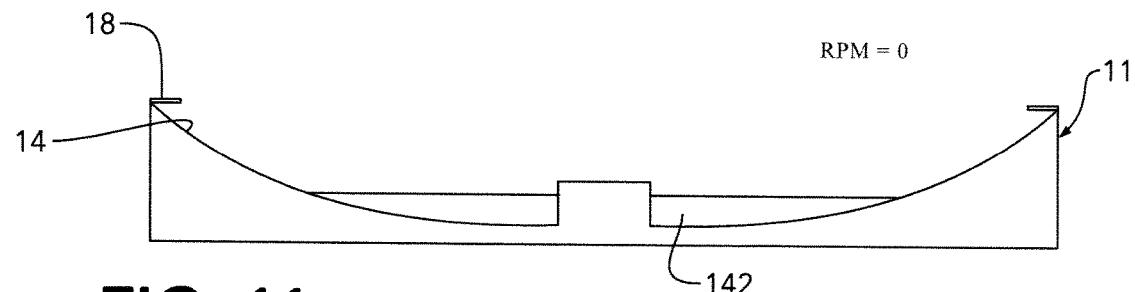
Figure 12:
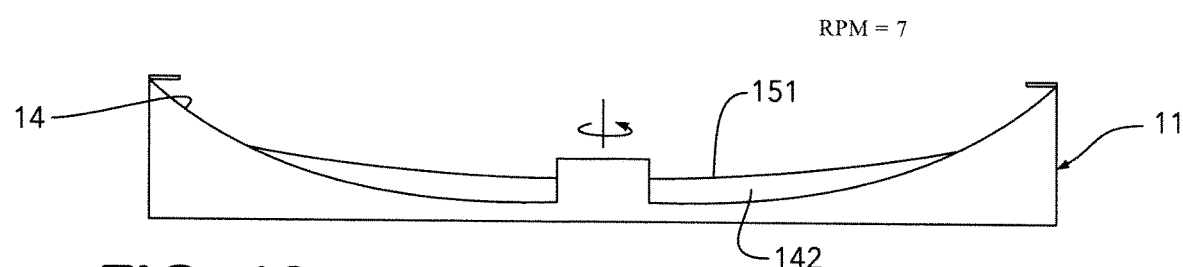
Figure 13:
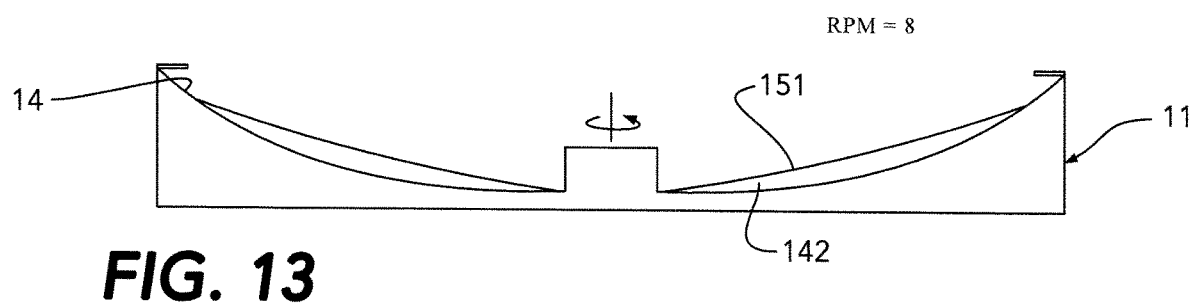

It should be noted that the drive mechanism 50 and the diameter of the bowl container 11 and the slope, height, and curvature of the sidewall 14 are configured so the bowl container 11 when partially filled with water may be safely rotate between 0 and 11 RPM. The rotation of the bowl container 11 may be increased to compensate for drag resistance created by the surfer 200. FIG. 11 shows the bowl container 11 filed with approximately 10 to 15% full is at rest (RPM=0), so the water 142 covers and settles to the bottom section of the bottom container 11. As rotation of the bowl container 11 is increased, centrifugal forces are exerted on the water 142 causing it to flow outward over the sidewall 14 and form a relatively shallow parabolic waveform 150. As rotation of the bowl container 11 increases, (RPM's 7 and 8), the shape of the parabolic waveform 150 also changes (see FIGS. 12 and 13, respectively).

FIG. 14, shows the shape of the parabolic waveform 150 when the bowl container is rotated at 9 RPM. The parabolic waveform 150 flattens out along the sidewall 14 and the upper, outer edge of the parabolic waveform 150 contacts the bottom surface of the upper flange 18. At this rotation speed, the face angle of the parabolic waveform 150 is approximately 30 degrees. Also, the depth (or distance 'd') is of the parabolic waveform 150 immediately below the front edge of the upper flange 18 to the inside surface of the sidewall 14 located immediately blow the front edge is approximately 12 inches.

FIG. 15 depicts the shape of the parabolic waveform 150 when the bowl container 11 is rotated at 10 RPM. The horizontal thickness of the upper edge of the parabolic waveform 150 is approximately equal to the width of the upper flange 18. The face angle of the parabolic waveform 150 is approximately 32 degrees. The depth of the parabolic waveform 150 from the inside edge of the upper flange 18 to the inside surface of the sidewall 14 immediately below the front edge of the upper flange 18 is approximately 14 inches FIG. 16 depicts the shape of the parabolic waveform 150 when the bowl container 11 is rotated at 11 RPM. At this rate of rotation, the upper flange prevents the parabolic waveform 150 from flowing over the upper flange 18. The face angle of the parabolic wave form is increased to approximately 34 degrees. Also, the depth of the parabolic waveform 150 from the inside edge of the upper flange 18 to the inside surface of the curved panel 60 is approximately 16 inches.

During use, the operator adjusts the rotational rate of the bowl container 11 to create parabolic waveforms 150 with different front face angles (a) and different to depths (d). More skilled surfers 200 prefer higher face angles. Also, because most surfboards include fins that extend downward from their bottom surfaces, parabolic waveforms 150 with greater depths are desirable to prevent the fins from contacting the paddles 70 and sidewall 14.

All embodiments of the wave machine 8 may include a non-rotating island 90 placed in the middle of the bowl container 11. The island 90 may be attached to tethers 91, to a gangway, or a central post that keeps the island 90 from rotating with the bowl container 11. In the embodiment shown in the FIGS, the island 90 is similar to a floating dock or raft that includes a covering made of watertight padding or foam material for safety from fall or impact. During operation, the island 90 floats on the slow rotating water 142 in the middle of the bowl container 11. One advantage of using a floating island is the island 90 automatically readjusts its position to the optimum operational water level at various rotational speeds.

Figure 8:
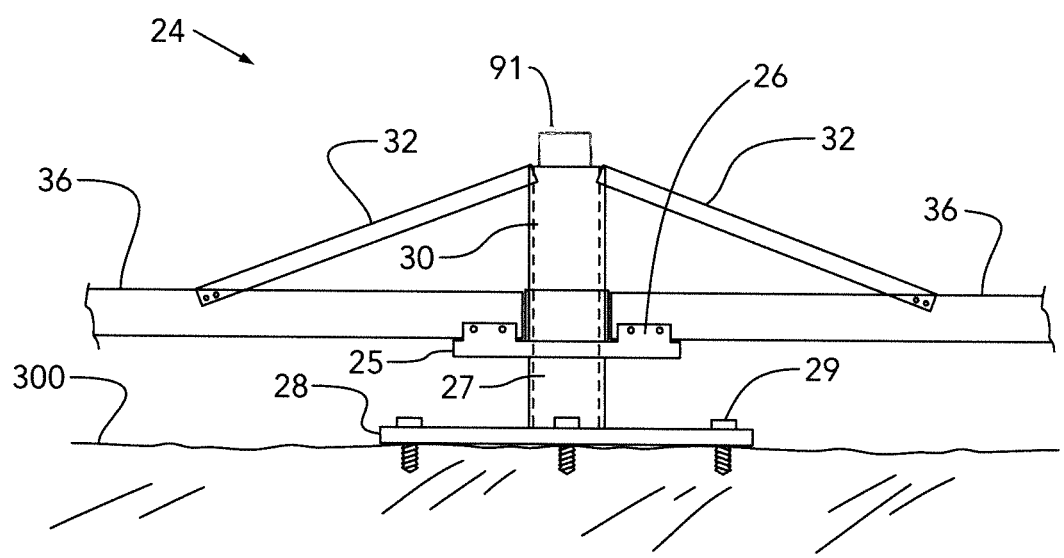
FIG. 8 is a partial side elevational view of the hub assembly.
Figure 9:
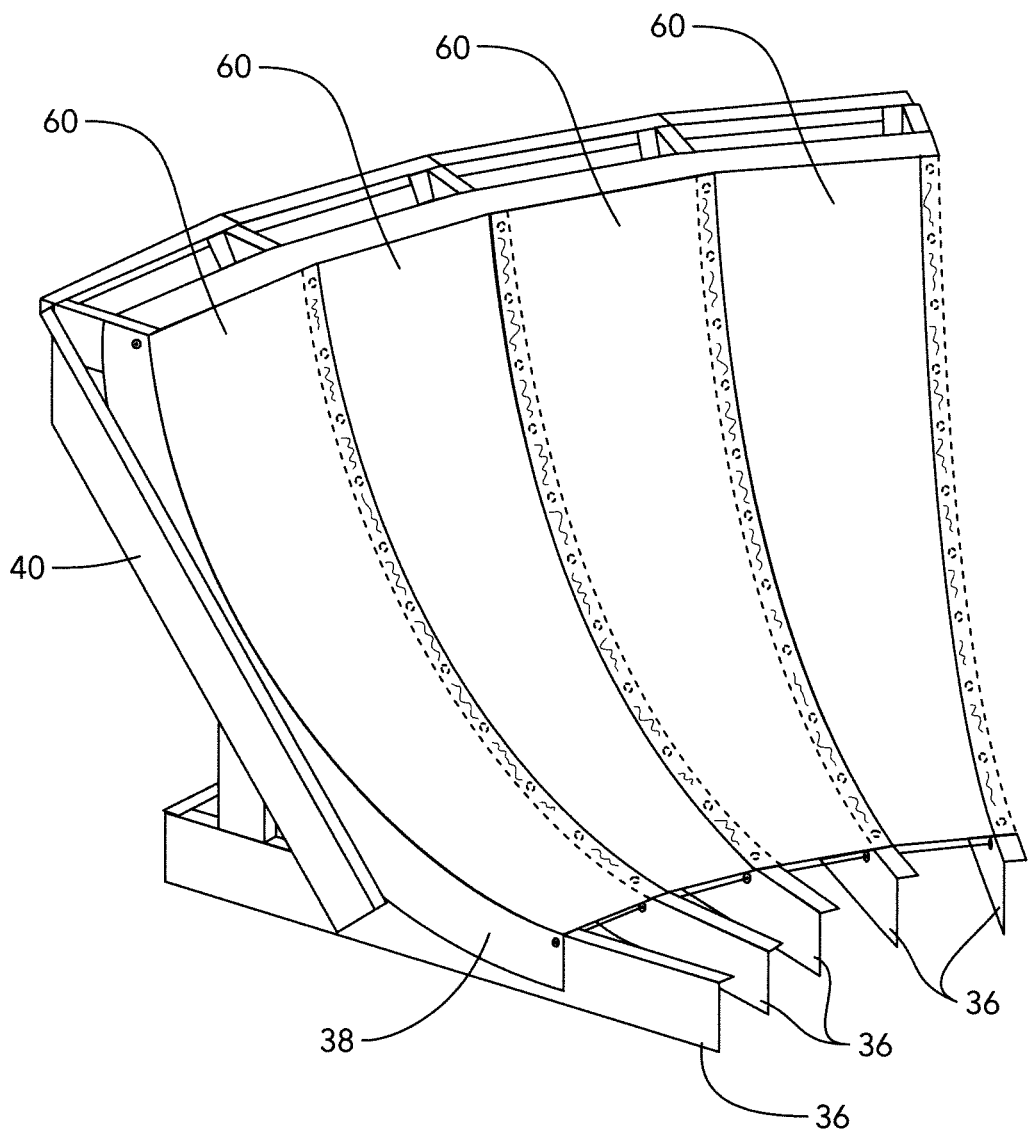
FIG. 9 is a partial perspective view showing how the edges of the outer panels overlapped and sealed together with an adhesive/sealant.

The island 90 can also be constructed of structural elements of galvanized steel or fiberglass supported by a central support post 91 that extends upward through the hub assembly 24 and mounted to the floor or ground below (see FIG. 8). The post 91 is sealed against leaks with a rotating seal like bearing seals in hub assembly 24. The island 90 is attached to the post 91 at the optimum level to match the best operational rotation speeds.

Figure 17:
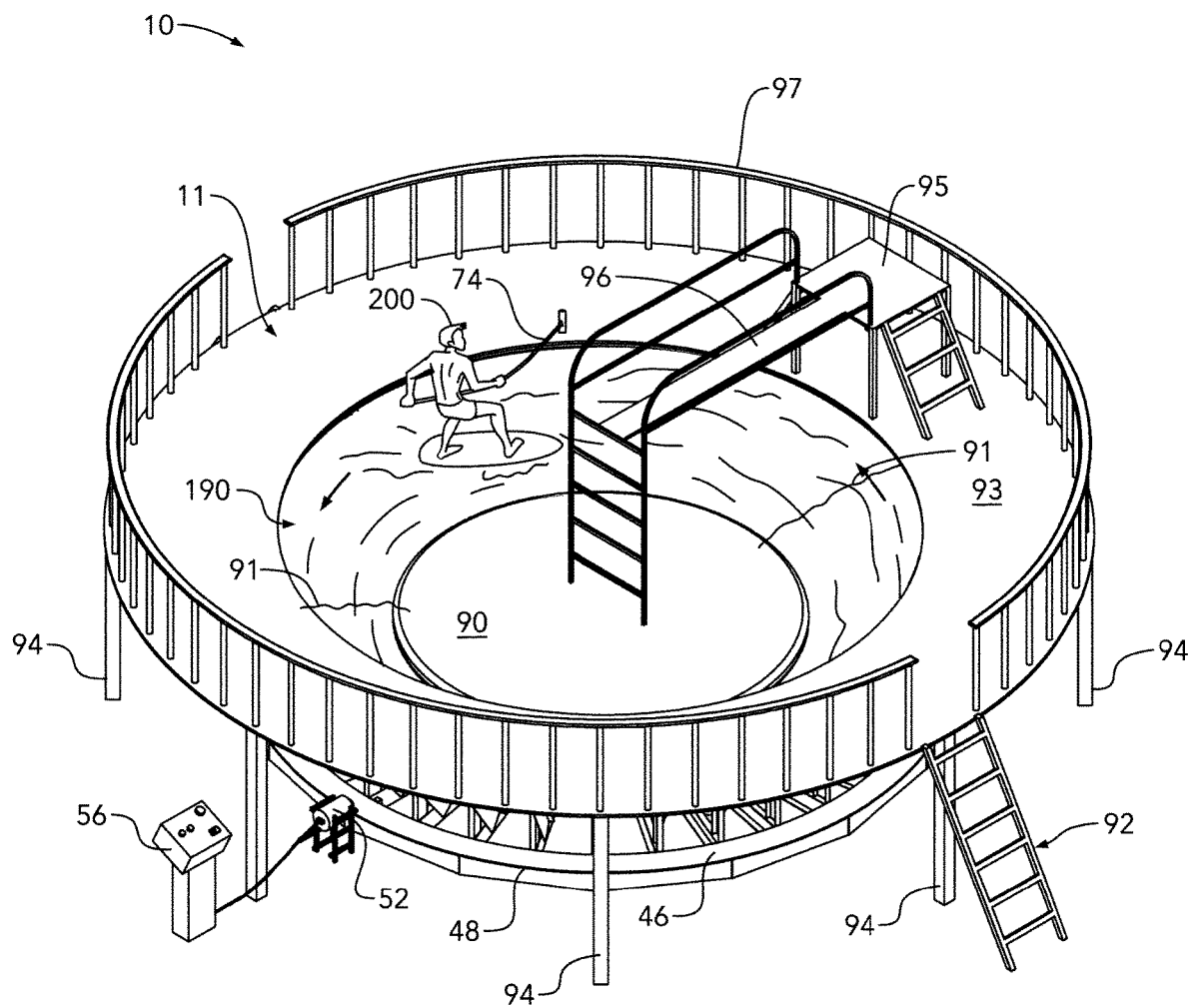
FIG. 17 is a top perspective view of the container partially filled with water that includes an optional coaxially aligned island, an optional first walkway located around the perimeter of the container and an optional second walkway that leads from the first walkway to the island.

FIG. 17 is a top perspective view of the bowl container 11 partially filled with water 142 that includes an optional coaxially aligned island 90, an optional first walkway 93 located around the perimeter of the bowl container 1 and an optional second walkway 96 that leads from the first walkway 93 to the island 90. Extending around the first walkway 93 is a handrail 97. The first walkway 93 and handrail 97 are supported on a support surface by vertical poles 94. A ladder 92 is provided that enables the surfer 200 to climb up to the first walkway 93. A platform 95 is provided that allows the surfer 200 to travel from the first walkway 93 to the second walkway 96, and then onto the island 90. The legs used on the second walkway 96 rest on the island 90 and used to hold the island 90 in place in the bowl container 11.

Figure 18:
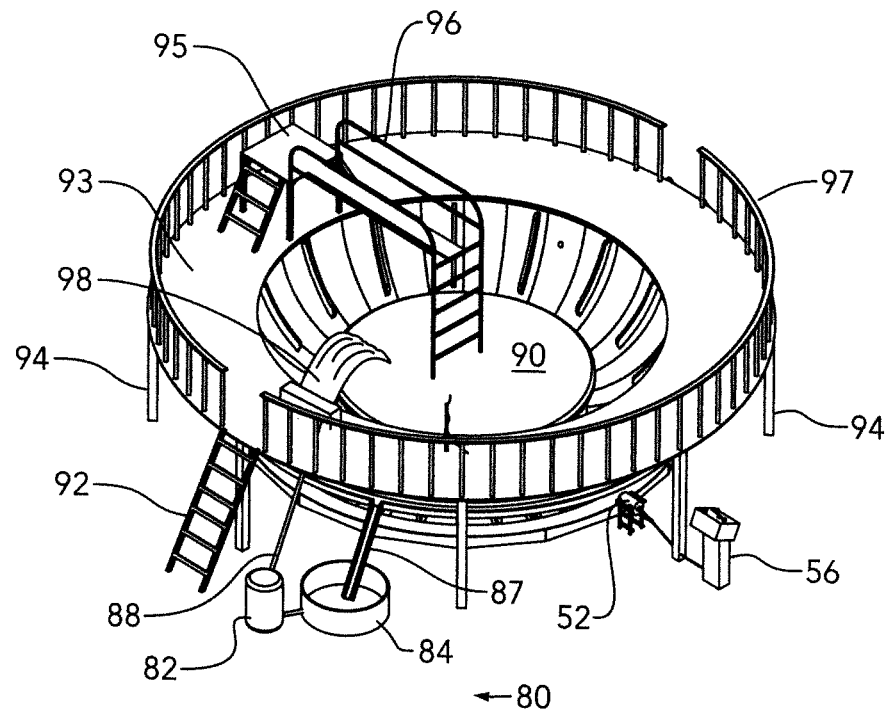
FIG. 18 is a top perspective view of the container shown in FIG. 15 without water that includes an optional water filter system that includes a water filter, an ingress conduit, an egress conduit, a pump configured to pump filter water to a decorative water fall element located adjacent to said upper edge of the container.
Figure 19:
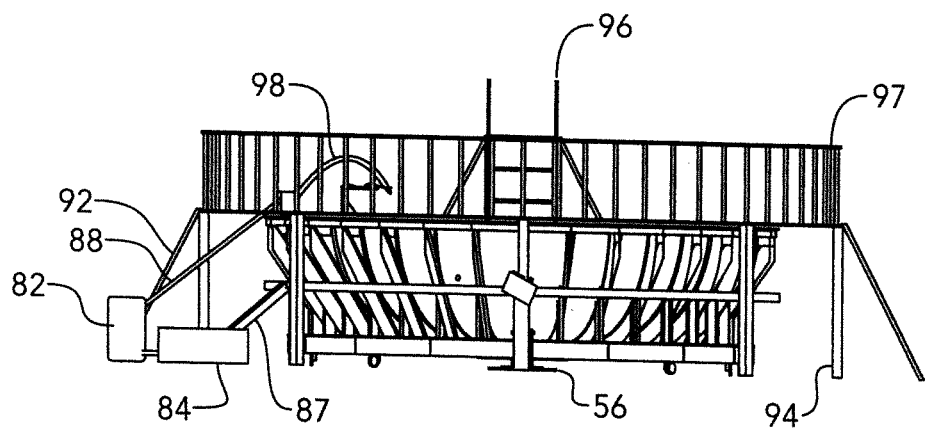
FIG. 19 is a side elevational view of the container shown in FIG. 18.

FIGS. 18 and 19 are views of the bowl container 11 shown in FIG. 17 without water that includes an optional water filtration system 80 that includes a water pump/filter tank 82, a collection tank 84, an ingress conduit 87, an egress conduit 88, and a water tunnel generator 89 located adjacent to said upper edge of the bowl container 11. During use, water 142 is removed from the container 11 and travels via the ingress conduit 87 to the holding tank 84. The water 142 from the holding tank 84 is then delivered to the water/pump filter tank 82. Water from the water/pump filter tank 82 is then delivered to the water tunnel generator 89 via the egress conduit 88. When water 142 flows over the water tunnel generator 89, an ocean-like wave tunnel is formed that surfers 200 may surf under.

Figure 21:
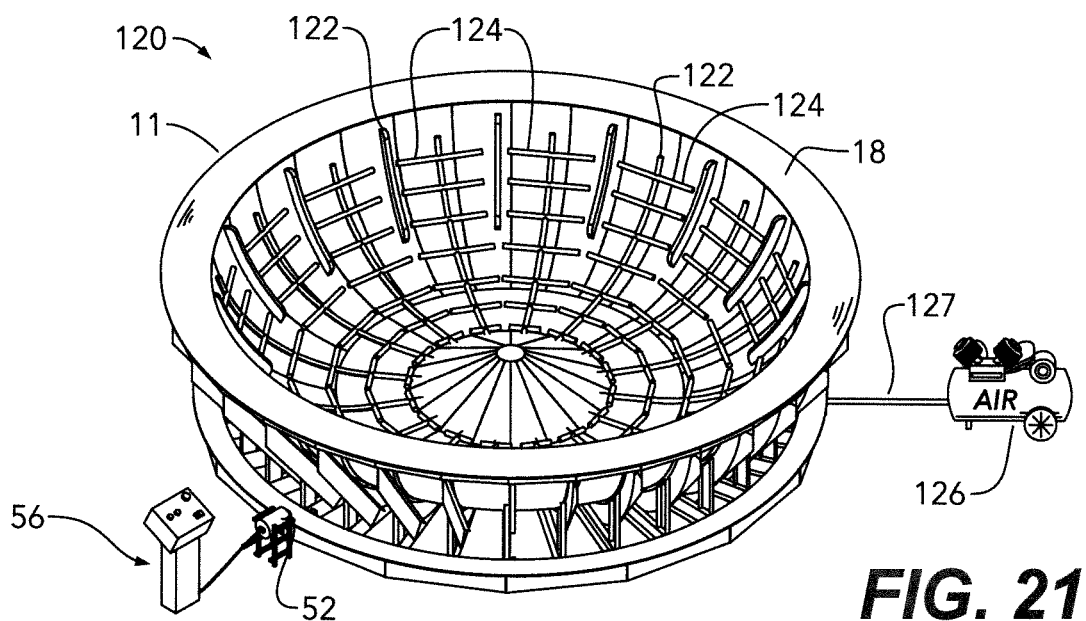
FIG. 21 is a top perspective view of the rotating container configured to be filled with granules that form a fluidized bed shown in FIG. 20.
Figure 22:
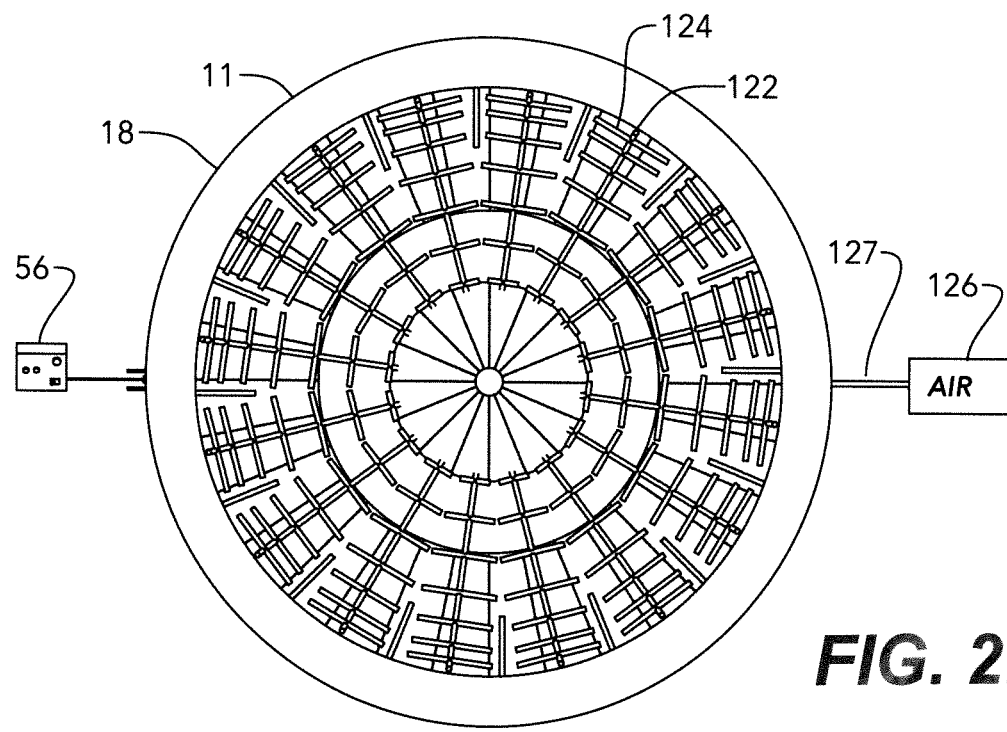
FIG. 22 is a top plan view of the container shown in FIG. 21.

As stated previously, the embodiment shown in FIGS. 1-19 use a container 11 configured to be used with water 142. It should be understood the invention could be used with a fluidized bed 120 made of sand granules 121 used in place of water 142. FIGS. 21 and 22 are views of a second rotating container 118 configured to be filled with sand granules 121 that form a fluidized bed 120. The container 118 is similar to bowl container 11 and configured to rotate in the same manner. Mounted on the inside surface of the curved panels 60 are plurality of radially aligned air conduits 122. Each air conduit 122 is attached to a swiveling main manifold 127 that connected to a main conduit 127 that connects to an air pressure source 126.

Figure 23:
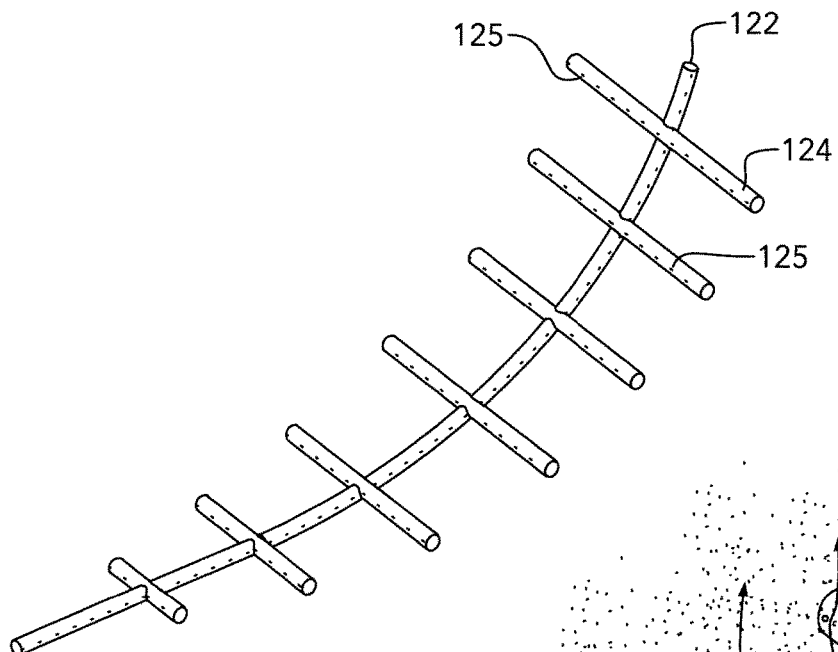
FIG. 23 is a top perspective view of an air conduit used in the fluidized bed embodiment shown in FIGS. 20-22 with plurality of perpendicularly aligned branches and showing air holes formed in the air conduit and branches.
Figure 24:
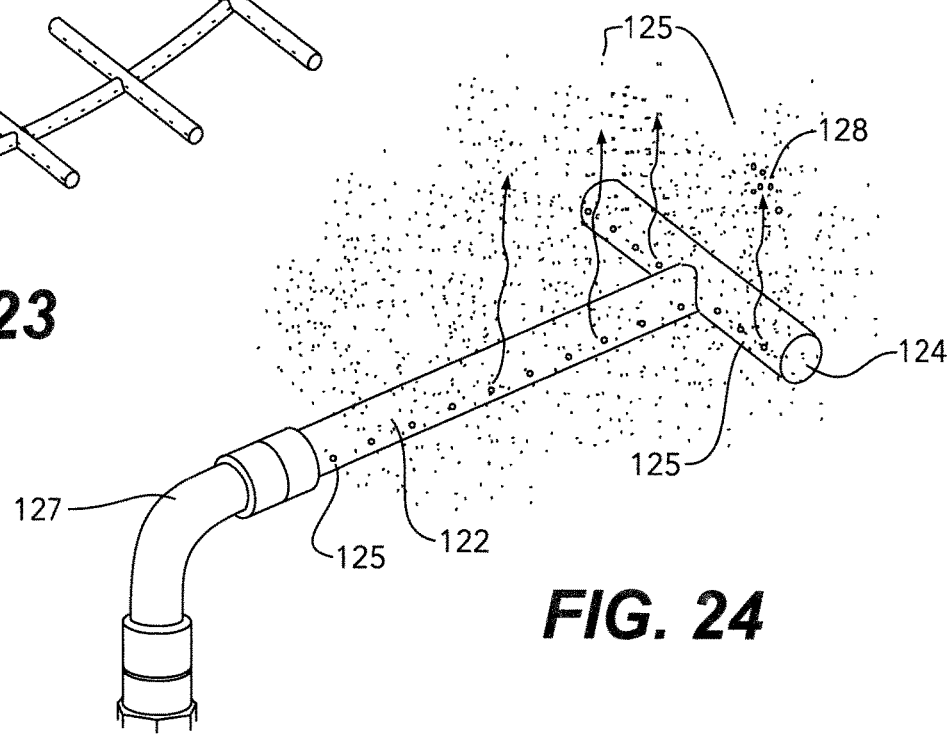
FIG. 24 illustrates air from the air conduit and branches being released and causing the granules to be fluidized.

FIG. 23 is a top perspective view of an air conduit 122 that includes a plurality of perpendicularly aligned branches 124. Formed on the air conduit 122 and branches 124 are holes 125. FIG. 24 illustrates air 128 from the air conduit 122 and branches 124 being released and causing the granules 121 to form the fluidized bed 120.

Figure 20:
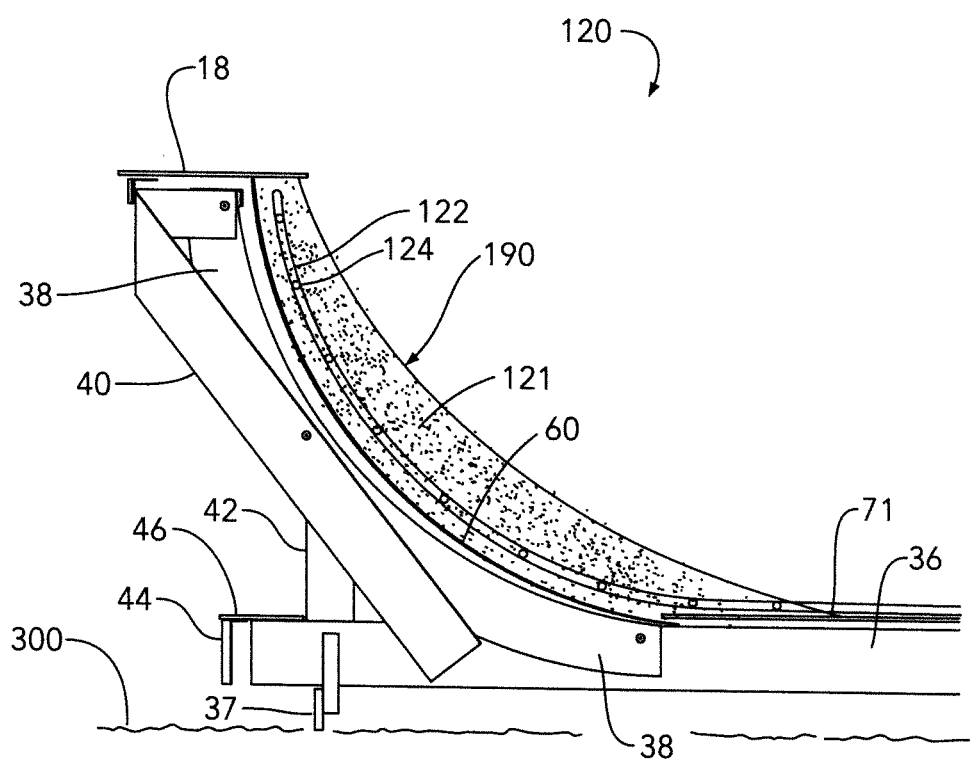
FIG. 20 is a section view of the container partially filled with granules that are fluidized and moved outward and upward along the sidewall and against the upper flange to form a parabolic waveform.

FIG. 20 is a section view of the container 118 partially filled particles 121 that are fluidized and the container 118 is rotated to form a parabolic waveform 150 in the fluidized bed 120.

Figure 25:
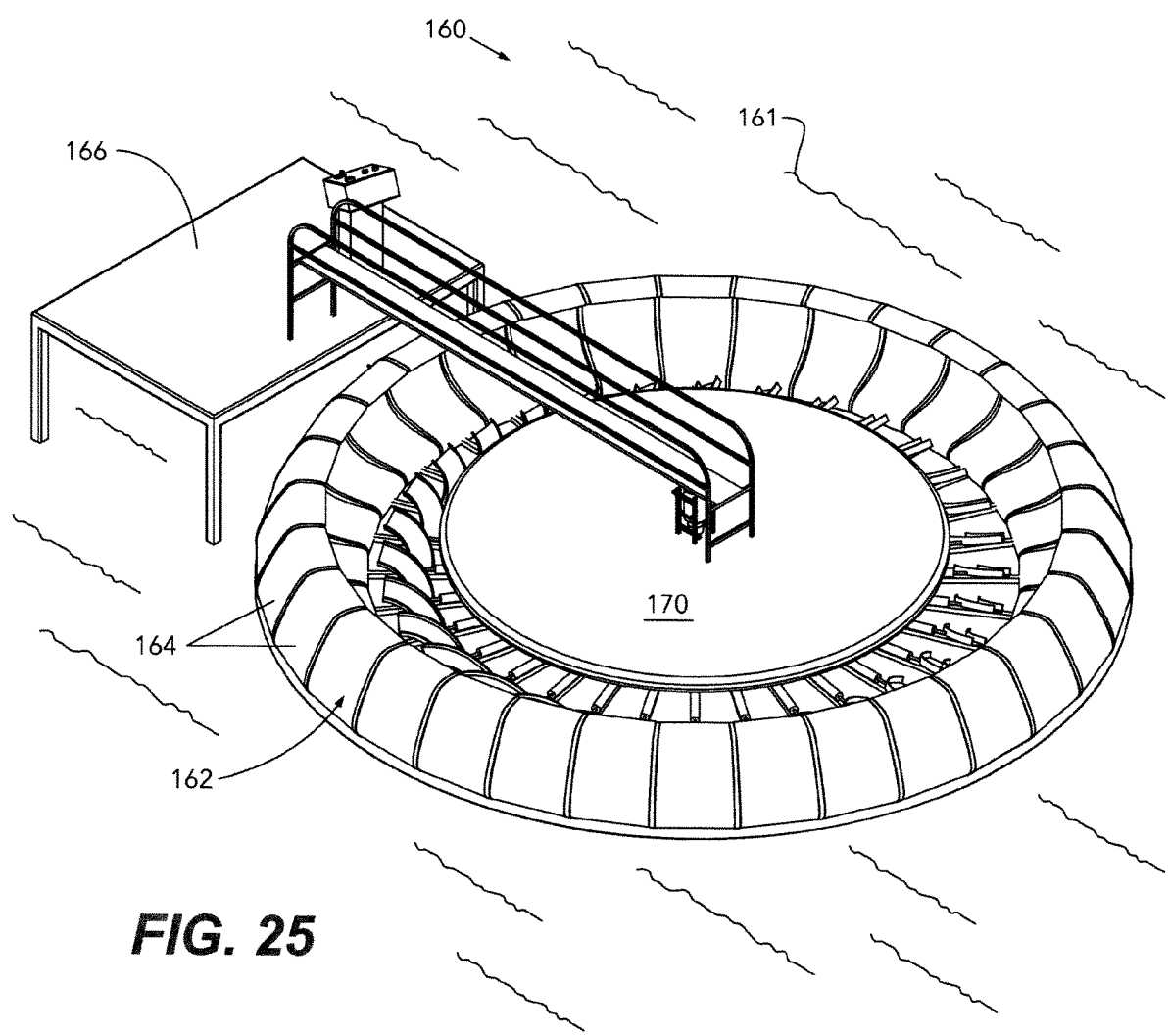
FIG. 25 is a floating wave machine that uses an outer container in a large body of water.
Figure 26:
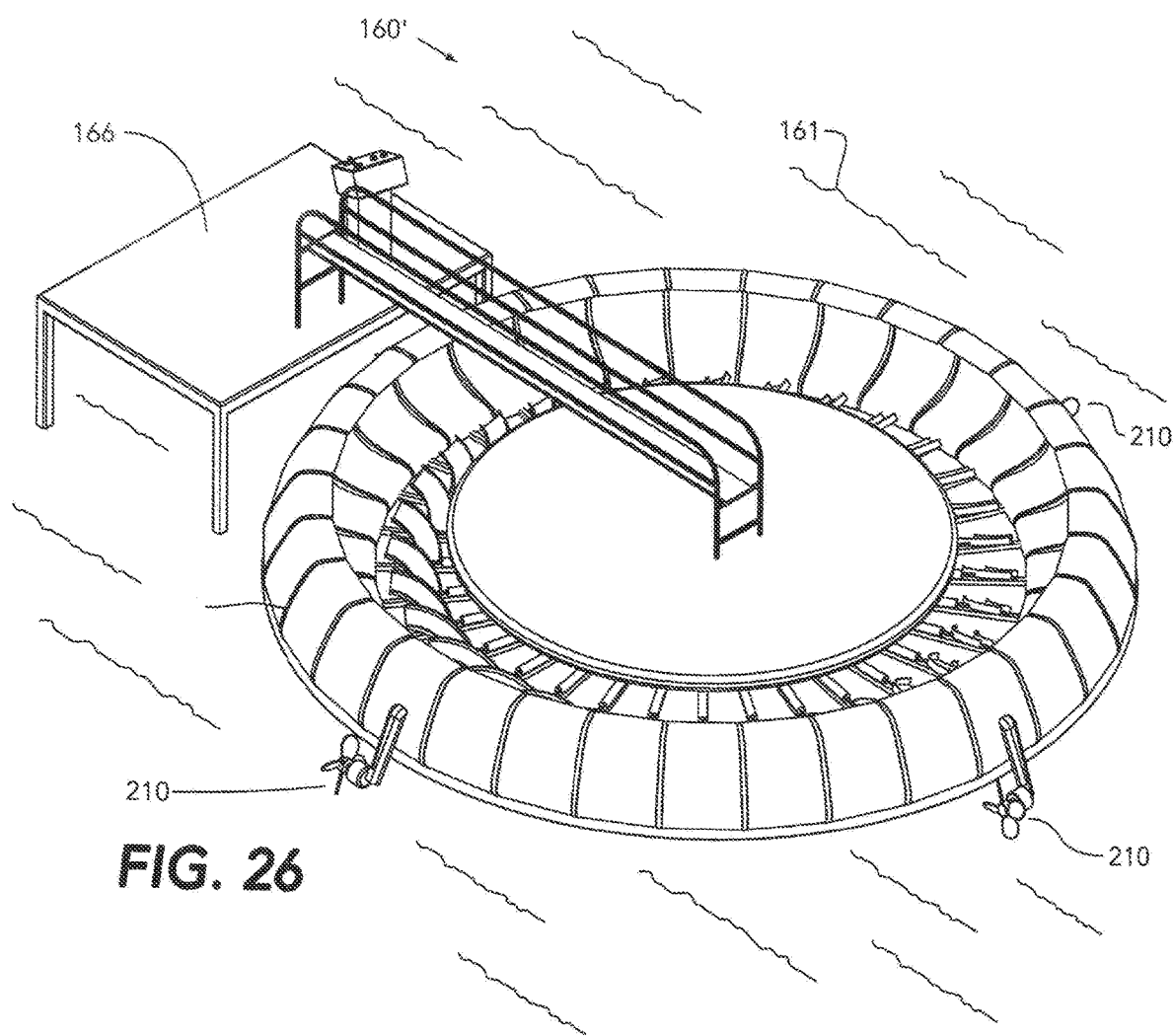
FIG. 26 is a floating embodiment of the wave machine similar to floating wave machine shown in FIG. 25 that uses propellers on the outer container to rotate the outer container in a large body of water.
Figure 27:
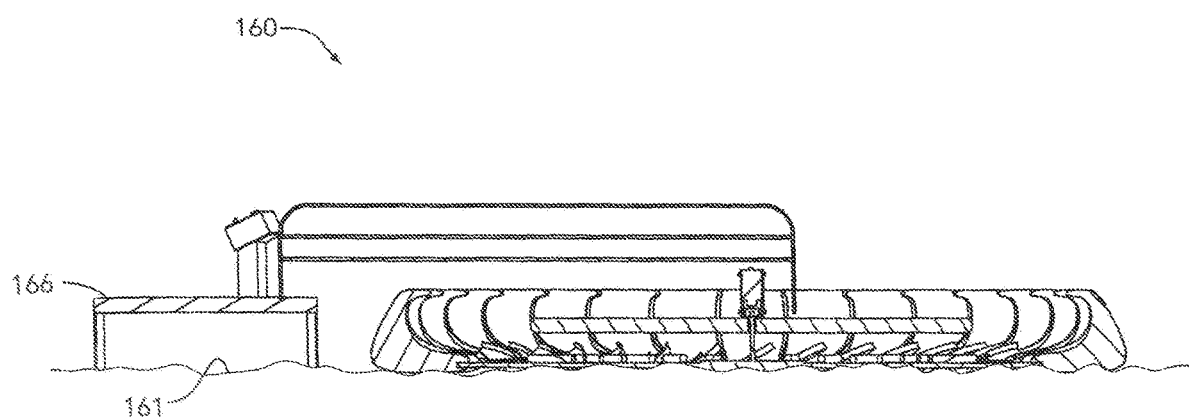
FIG. 27 is a sectional side elevational view of the wave machine shown in FIG. 25.

FIGS. 25-27 shows another embodiment of the wave machine, hereinafter referred to as a floating wave machine and indicated by reference number 160 configured to float in a large body of water 161. The floating wave machine 160 includes an outer ring 162 made of thirty-two pie shaped parabolic floats 164. The floats 164 are made of made of watertight materials, such as rotationally molded plastic, fiberglass, or welded metal and designed to provide buoyancy. The floats 164 may be foam filled to limit water intrusion therein.

The floating ring 162 is attached to a radially aligned rib 186. The ribs 186 are attached to a center hub 185. The hub 185 is connected to a drive motor. 189.

Each float 164 includes a curved inside surface 169 configured to form a parabolic waveform 150 similar to the parabolic waveform 150 when water travels over the inside surface 169. The floating ring 162 is tethered to a dock 166 by a gangway 168 with ingress and egress ladders and a centrally located, non-rotating island platform 170. The surfer 200 uses the non-rotating island 170 to sit on while he positions himself and surfboard against the rotating parabolic waveform 150. The surfer 200 may use a lanyard (not shown) to pull himself up into a standing or surfing position where he rides the parabolic waveform 150 in successive turning motions.

Formed on the bottom of the floats 164 are a plurality of water chutes 184. Attached to each water chute 184 is a linear actuator 187. The actuators 187 are coupled to a sensor (not shown) configured to monitor the flow of water into the chute 184 and the formation of the parabolic waveform 150.

FIG. 26 is a floating embodiment of the wave machine 160' similar to floating wave machine 160 shown in FIG. 25 that uses propellers 210 on the floating ring 162' to rotate the floating ring 184 in a large both of water 161.

Figure 28:
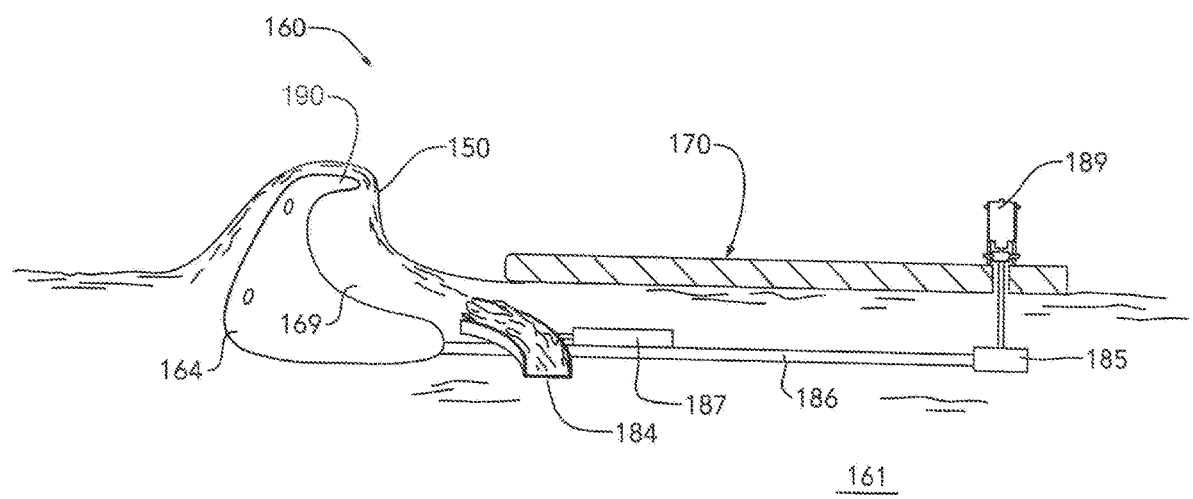
FIG. 28 is an enlarged, sectional view of the outer container and the island used in the wave machine shown in FIG. 25.

As shown in FIG. 28, the parabolic waveform 150 is formed inside the floating ring 162 as water from the surface of the large body of water 161 is scooped up by water chutes 184. The water then flows onto the inside surfaces 169 of the floats 164. Formed on the top surface of the floats 164 is an inward curved upper flange 190. As water flows against the upper flange 190 it may overflow to the outside diameter surface of the floats 164 and return to the surface of the large body of water 161.

During operation, water flows continuous upward and produces an upslope flow of water that enhances the circular flow of the floating ring 162 so the surfer 200 can let go of the lanyard tow rope and surf down the upward flowing water which provides momentum used to propel the surfboard upstream against the rotating flow. When the surfer 200 falls, he travels around the floating ring with his surfboard until he climbs back onto the island 170 retrieves his board and resumes the ride or gives another rider a turn.

FIG. 28 is an enlarged, sectional view of the floating ring 162 and the island 170.

Figure 29:
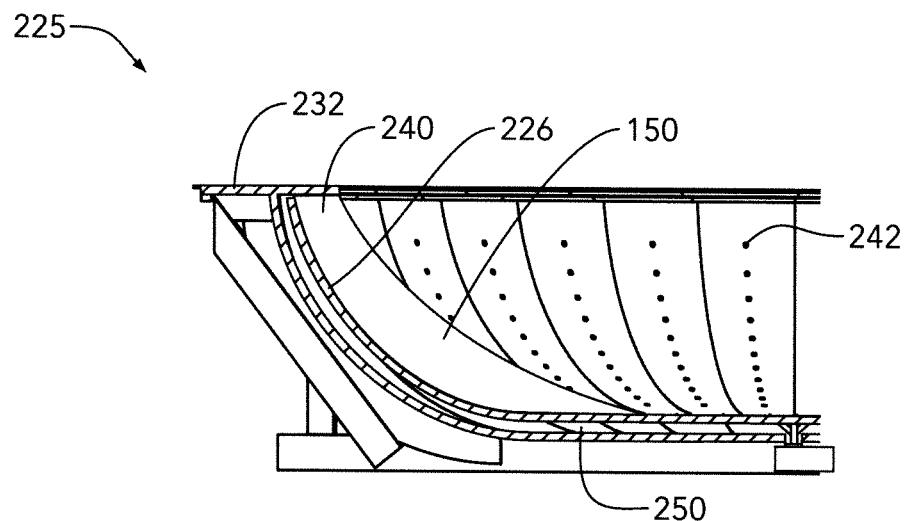
FIGS. 29 and 30 are partial, sectional, side elevational views of a bowl within a bowl embodiment.
Figure 30:
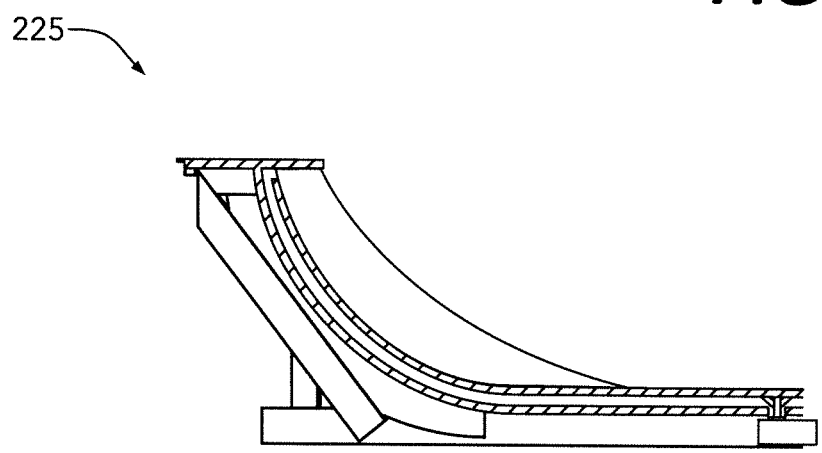

FIGS. 29 and 30 disclose another embodiment, called a bowl-in-a-bowl system, indicated by the reference number 225, that utilizes two bowl shaped containers 230, 240 to contain a controlled volume of water with in the first non-rotating outer bowl container 230 while the second inner rotating bowl container 240 is rotated to form a parabolic waveform 150. The inward sloping top flange 232 of the outer bowl container 230 contains the water pushed up the sidewall 226 forming a parabolic waveform 150. The inner bowl container 230 has holes 242 so that it neutrally ballasts where it is slightly heavier than water and floats within the water column, so the centrifugal force generated by the rotation holds the inner bowl near the surface of the outer bowl. The smaller diameter of the inner bowl container 240 keeps the inner bowl container 240 from scraping against the outer bowl container 230. The friction of the water 250 against the rotating inner bowl container 240 cause the water to move up the sidewall of the outer bowl container 230 forming a parabolic waveform 150.

The container 225 moves all the load caring structural elements to the non-rotating bowl container 240 with no weight carrying capacity needed for the rotating inner bowl container 230. The inner bowl container 230 can therefore be made of flexible or lightweight materials only strong enough to resist torque and rotational loads. This bowl-in-a-bowl embodiment 225 simplifies construction because the load carrying structural elements need not handle rotational loads combined with water weight loads and the structure can be mounted to the ground further enhancing and simplifying the structure.

INDUSTRIAL APPLICABILITY

This invention has application in the sports training industry. This invention has application in the wave boarding and wave surfing training industries.

I claim:

1. A floating wave machine, comprising:
  a. a floating ring made of a plurality of floats joined together around a center vertical axis, each said float made of buoyant material and configured to float in a body of water, each said float has a parabolic-shaped inside surface and an inward extending upper flange configured to form a parabolic waveform when said floating ring is rotated in said body of water:
  b. means for rotating said floating ring around said center vertical axis in said body of water, said means for rotating said floating ring configured to rotate said floating ring at different speeds to create centrifugal forces on said body of water that causes water from said body of water to flow outward and upward over said inside surface and up to said upper flange and thereby forming different parabolic waveforms inside said floating ring; and
  c. a control module connected to said means for rotating said floating ring that controls the rotation speed of said floating ring in said body of water.

2. The floating wave machine as recited in claim 1 farther including a non-rotating, coaxially aligned island inside said floating ring.

3. The floating wave machine as recited in claim 2 further including a gangway that extends inward over said floating ring u and supported on one end by said island.

4. The wave machine as recited in claim 1 further including a plurality of water chutes configured to deliver water from said body of water to said inside surfaces of said floats as said floating ring is rotated in said body of water.

5. The wave machine as recited in claim 4 further including sensors and actuators that monitor and control the flow of said water from said body of water into said water chutes and the formation of said parabolic waveform inside said floating ring when said floating ring rotates in said body of water.

6. The floating wave machine as recited in claim 1, wherein said means for rotating said floating ring in said body of water is a drive motor coupled to said floating ring.

7. The floating wave machine as recited in claim 6, wherein said drive motor is mounted on an, island located inside said floating ring.

8. The floating wave machine as recited in claim 1, wherein said means for rotating said floating ring in said body of water is one or more propellers configured to cause said floating ring to rotate.

\* \* \* \* \*